US010402599B2

(12) United States Patent
Lu et al.

(10) Patent No.: US 10,402,599 B2
(45) Date of Patent: Sep. 3, 2019

(54) CARD READER SUPPORTING HIGH-SPEED DATA COMMUNICATION, AND OPERATING METHOD THEREOF

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 16/070,323

(22) PCT Filed: Jan. 25, 2017

(86) PCT No.: PCT/CN2017/072543
§ 371 (c)(1),
(2) Date: Jul. 16, 2018

(87) PCT Pub. No.: WO2017/133603
PCT Pub. Date: Aug. 10, 2017

(65) Prior Publication Data
US 2019/0026505 A1 Jan. 24, 2019

(30) Foreign Application Priority Data
Feb. 3, 2016 (CN) .......................... 2016 1 0077395

(51) Int. Cl.
*G06K 7/10* (2006.01)
(52) U.S. Cl.
CPC ..... *G06K 7/10217* (2013.01); *G06K 7/10009* (2013.01); *G06K 7/10029* (2013.01);
(Continued)

(58) Field of Classification Search
CPC .......... G06K 7/10217; G06K 7/10009; G06K 7/10029; G06K 7/10297; G06K 7/10366; G06K 7/10316
See application file for complete search history.

(56) References Cited

U.S. PATENT DOCUMENTS 3,597,549 A * 8/1971 Farmer ..................... H04L 5/02
178/2 D
4,048,476 A * 9/1977 Lawter ................... G06K 13/08
235/479

(Continued)

*Primary Examiner* — Thomas D Alunkal
(74) *Attorney, Agent, or Firm* — Hammer & Associates, P.C.

(57) ABSTRACT

An operating method of a card reader supporting high-speed data communication. The method comprises: if a card reader determines that a first in-place flag is not valid, then the card reader sends a card query instruction in a contactless field, sends a speed adjustment configuration instruction to a contactless card upon receiving of query response data returned by the contactless card, and determines whether response data indicating successful speed adjustment configuration and returned by the contactless card is received; and if so, then the card reader configures communication speeds thereof, such that a received first instruction is sent to the contactless card with a first communication speed, and an operation result returned by the contactless card is received with a second communication speed, otherwise the card reader configures the communication speeds thereof, such that a received first instruction is sent to the contactless card with a third communication speed, and an operation result returned by the contactless card is received with a fourth communication speed, wherein the first communication speed is greater than the third communication speed, and the second communication speed is greater than the fourth communication speed. The above method can shorten interaction time between a contactless card reader and a contactless card, thereby improving user experience.

20 Claims, 6 Drawing Sheets

(52) U.S. Cl.
CPC ..... *G06K 7/10297* (2013.01); *G06K 7/10316* (2013.01); *G06K 7/10366* (2013.01)

(56) References Cited

U.S. PATENT DOCUMENTS

| | | | |
|---|---|---|---|
| 6,394,344 B1* | 5/2002 | Katsumura | G06K 17/0022 235/380 |
| 8,423,703 B2* | 4/2013 | Jo | G06F 13/385 710/13 |
| 2001/0005878 A1* | 6/2001 | Sasaki | G11C 7/16 711/154 |
| 2002/0162111 A1* | 10/2002 | Shimizu | H04N 7/17318 725/87 |
| 2004/0169081 A1* | 9/2004 | Azuma | G06K 19/0707 235/451 |
| 2011/0163855 A1* | 7/2011 | Takeuchi | G06K 7/0008 340/10.3 |
| 2013/0236032 A1* | 9/2013 | Wakeland | G10L 19/002 381/104 |

* cited by examiner

201: The card reader determines whether the first in-place identification is valid (to be continued)

(continue)

202: The card reader determines whether the timer value of the timer reaches the time for inquiring card
    203: The card reader sets the time for inquiring card as the timer value plus the preset value
    204: The card reader determines whether the inquiring command sent this time is TYPE A card inquiring card instruction
    205: The card reader sets the inquiring card identification as TYPE A card
    206: The card reader sets parameters of the contactless card reading chip according to the TYPE B mode
    207: The card reader sends the TYPE B card inquiring card instruction in the contactless field, and executes anti-collision and selection based on time slot
    208: The card reader determines whether TYPE B card inquiring card response data returned by the contactless card is received
    209: The card reader records information of the contactless card
    210: The card reader determines whether the contactless card supports 14443-4 layer protocol
    211: The card reader sends TYPE B card selection instruction to the contactless card
    212: The card reader determines whether TYPE B card selection instruction response data returned from the contactless card is received
    213: The card reader sets the inquiring card identification as TYPE B card
    214: The card reader sets the parameters of the contactless card reading chip according to TYPE A card mode;
    215: The card reader sends TYPE A card inquiring card instruction in the contactless field
    216: The card reader determines whether TYPE A card inquiring card response data returned from the contactless card is received
    217: The card reader executes bit-based anti-collision and selection on the contactless card;
    218: The card reader determines whether the anti-collision and the selection are successfully executed
    219: The card reader determines whether the contactless card supports the 14443-4 layer protocol
    220: The card reader sends the TYPE A card selection instruction to the contactless card
    221: The card reader determines whether the TYPE A card selection instruction response data returned from the contactless card is received
    222: The card reader sends the S block speed regulation inquiring instruction to the contactless card
    223: The card reader determines whether the speed regulation inquiring response data returned from the contactless card is received
    224: The card reader determines whether the contactless card, which is speed regulated, supports a preset speed and a transmission speed faster than the preset speed
    225: The card reader sends the S block speed regulation setting instruction to the contactless card
    226: The card reader determines whether the speed regulation setting successful response returned from the contactless card is received
    227: The card reader determines whether the contactless card which is currently operating is TYPE A card
    228: The card reader amends parameters of the contactless card reading chip according to TYPE B

229: The card reader sets the communication speed for sending the received CCID command to the contactless card as the first communication speed, and sets the communication speed for receiving the operation result returned from the contactless card as the second communication speed 230: The card reader sets the communication speed for sending the received CCID command to the contactless card as a third communication speed, and sets the communication speed for receiving the operation result returned from the contactless card as a fourth communication speed 231: The card reader sets the first in-place identification as valid, sends the card in-place information to the upper computer, sets the time of checking card in the field as the timer value of the timer plus the preset value 232: The card reader waits for receiving CCID command sent from the upper computer 233: The card reader determines whether the first receiving identification is valid 234: The card reader sets the first receiving identification as invalid 235: The card reader determines the type of CCID command 236: The card reader extracts valid information from the APDU command 237: The card reader sends the valid information to the contactless card 238: The card reader determines whether APDU response data returned from the contactless card is received 239: The card reader extracts the valid information from the APDU response data to compose CCID response data 240: The card reader sends CCID response data to the upper computer 241: The card reader organizes APDU error response data 242: The card reader sends the APDU error response data to the upper computer 243: The card reader organizes power off response data and returns the power off response data to the upper computer 244: The card reader organizes power on response data and returns the power on response data to the upper computer 245: The card reader determines whether the timer value of the timer reaches the time of contactless card leaving 246: The card reader sets the time of contactless card in the field as the timer value of the timer plus the preset value 247: The card reader sends R block which includes negative response to the contactless card 248: The card reader determines whether the R block response data returned from the contactless card is received 249: The card reader sets the first in-place identification as invalid, and sends the contactless card leaving information to the upper computer

Fig. 2C

CARD READER SUPPORTING HIGH-SPEED DATA COMMUNICATION, AND OPERATING METHOD THEREOF

FIELD OF THE INVENTION

The present invention relates to a card reader for supporting high speed data communication and a working method of the card reader, which belongs to the field of communication technology.

PRIOR ART

In prior art, generally speaking, a communication speed of data interacted between a contactless card reader and a contactless card can just reach 106 kbps, and sometimes, some card reader can support 848 kbps via a PPS speed regulation. However, it needs a long period of time when there is a mass of data information interacted between the contactless card reader and the contactless card, thus, usage of some contactless cards is limited because users do not feel convenient.

SUMMARY OF THE INVENTION

The object of the present invention is to provide a card reader for supporting high speed data communication and a working method of the card reader, which can reduce the time of interaction between a contactless card reader and a contactless card by improving the communication speed of data communication between the contactless card reader and contactless card so as to it becomes more convenient for users.

Thus, according to one aspect of the present invention, there is provided a working method of a card reader for supporting high speed data communication, which includes:

Step S1, determining, by the card reader, whether a first in-place identification is valid, if yes, sending contactless card in-place information to an upper computer, and executing Step S5; otherwise, executing Step S2;

Step S2, sending, by the card reader, an inquiring card instruction in a contactless field, and sending a speed regulation setting instruction to the contactless card in the case that an inquiring card response data returned from the contactless card is received, and determining whether speed regulation setting successful response data, which is returned from the contactless card, is received, if yes, executing Step S3; otherwise, executing Step S4;

Step S3, setting, by the card reader, the communication speed for sending a first command received to the contactless card as a first communication speed, and setting the communication speed for receiving an operation result returned from the contactless card as a second communication speed, and setting the first in-place identification as valid, sending the card in-place information to the upper computer, and executing Step S5;

Step S4, setting, by the card reader, the communication speed for sending the first command received to the contactless card as a third communication speed, and setting the communication speed for receiving the operation result returned from the contactless card as a fourth communication speed, and setting the first in-place identification as valid, sending the card in-place information to the upper computer, and executing Step S5, the first communication speed is faster than the third communication speed, and the second communication speed is faster than the fourth communication speed; and Step S5, waiting for, by the card reader, receiving a command sent from the upper computer, doing a corresponding operation on the contactless card according to the first command so as to obtain an operation result in the case that the first command is received, sending the operation result to the upper computer, and returning to Step S1.

Preferably, before Step S1, the method further includes:
initializing, by the card reader, a first in-place identification as invalid; and in Step S5, the card reader waiting for receiving the command sent from the upper computer, when the first command is received, the method further includes: determining, by the card reader, whether the first in-place identification is valid, if yes, doing operation on the contactless card according to the first command to obtain an operation result, and sending the operation result to the upper computer, and returning to Step S1; otherwise, sending contactless card leaving information to the upper computer, and returning to Step S1.

Preferably, before Step S1, the method further includes:
initializing, by the card reader, a first receiving identification as invalid;

before Step S5, the method further includes: determining, by the card reader, whether the first receiving identification is valid, if yes, doing corresponding operation on the contactless card according to the first command to obtain the operation result and returning the operation result to the upper computer, and returning to Step S1; otherwise, executing Step S5; and in Step S5, in the case that the card reader receives the first command, the method further includes: setting, by the card reader, the first receiving identification as valid.

Preferably, before Step S1, the method further includes:
Step A1, determining, by the card reader, whether the first receiving identification is valid, if yes, executing Step A2; otherwise, executing Step S1;

Step A2, determining, by the card reader, whether the first command is an obtaining contactless card status instruction, if yes, executing Step A3; otherwise, executing Step S1; and Step A3, setting, by the card reader, the first receiving identification as invalid, organizing contactless card status information and sending the information to the upper computer, and executing Step S1.

Preferably, in the case that the speed regulation setting successful response data returned from the contactless card is received in Step S2, before the card reader doing operation on the contactless card according to the first command to obtain the operation result in Step S5, the method further includes:

determining, by the card reader, whether the contactless card which is currently operating is a first class of card, if yes, amending parameters of a contactless card reading chip in accordance with a second class of card, and doing operation on the contactless card according to the first command to obtain the operation result; otherwise, doing corresponding operation on the contactless card according to the first command to obtain an operation result.

Preferably, before the card reader sending the speed regulation setting instruction to the contactless card in Step S2, the method further includes:

Step A1', sending, by the card reader, a speed regulation inquiring instruction to the contactless card, and determining whether speed regulation inquiring response data returned from the contactless card is received, if yes, executing Step A2'; otherwise, the contactless card does not support high-speed data communication, and executing Step S4; and Step A2', determining, by the card reader, whether the contactless card supports a preset speed or a communication speed faster than the preset speed after a speed regulation of the contactless card according to the speed regulation inquiring response data, if yes, sending the speed regulation setting instruction to the contactless card; otherwise, the contactless card does not support the high-speed data communication, and executing Step S4.

Preferably, Step A2' specifically includes: analyzing, by the card reader, the speed regulation inquiring response data received, and determining whether the preset speed is faster than a sending speed and a receiving speed supported by the contactless card which is speed-regulated, if yes, the contactless card does not support high-speed data communication, and executing Step S4; otherwise, sending the speed regulation setting instruction to the contactless card.

Preferably, after Step A2', the method further includes:

Step B, determining, by the card reader, the fastest speed supported by the contactless card which is speed regulated is faster than the fastest speed supported by the card reader, if yes, making the fastest speed supported by the card reader as a consulted communication speed, and sending the speed regulation setting instruction to the contactless card; otherwise, making the fastest speed supported by the contactless card as the consulted communication speed, and sending the speed regulation setting instruction to the contactless card.

Preferably, Step B specifically includes:

Step B-1, determining, by the card reader, whether the fastest sending speed supported by the contactless card which is speed regulated is faster than the fastest receiving speed supported by the card reader, if yes, making the fastest receiving speed supported by the card reader as a consulted receiving speed, and executing Step B-2; otherwise, making the fastest sending speed supported by the contactless card as the consulted receiving speed, and executing Step B-2; and Step B-2, determining, by the card reader, whether the fastest receiving speed supported by the contactless card which is speed regulated is faster than the fastest sending speed supported by the card reader, if yes, making the fastest sending speed supported by the card reader as the consulted sending speed, and sending the speed regulation setting instruction to the contactless card; otherwise, making the fastest receiving speed supported by the contactless card as the consulted sending speed, and sending the speed regulation setting instruction to the contactless card.

Preferably, the card reader setting the communication speed for sending the first command received to the contactless card as the first communication speed, and setting the communication speed for receiving the operation result returned from the contactless card as the second communication speed in Step S4 specifically includes that the card reader sets its communication speed for sending the first command received to the contactless card as the consulted sending speed, and sets the communication speed for receiving the operation result returned from the contactless card as the consulted receiving speed.

Preferably, the method further includes:

Step K1, determining, by the card reader, a second in-place identification is valid, if yes, sending contact card in-place information to the upper computer, and executing Step K2; otherwise, returning to Step K1; and Step K2, waiting for, by the card reader, receiving a command sent from the upper computer, in the case that the command is a second command, doing corresponding operation on the contact card according to the second command to obtain an operation result, and sending the operation result to the upper computer, and returning to Step K1.

Preferably, before Step K1, the method further includes:

the card reader initializing the second in-place identification as invalid, and initializing the second receiving identification as invalid;

in Step K2, before doing the corresponding operation on the contact card according to the second command to obtain the operation result, the Step further includes:

Step C, determining, by the card reader, whether the second in-place identification is valid, if yes, doing corresponding operation on the contact card according to the second command to obtain the operation result; otherwise, sending contact card leaving information to the upper computer, and returning to Step K1;

in the case that the card reader receives the second command, Step K2 further includes: setting, by the card reader, said second receiving identification is valid.

Preferably, before Step K1, the method further includes:

Step D1, determining, by the card reader, whether the second receiving identification is valid, if yes, executing Step D2; otherwise, executing Step K1; and Step D2, determining, by the card reader, whether the second command is an obtaining contact card status instruction, if yes, setting the second receiving identification as invalid, organizing contact card status information and sending the information to the upper computer, and executing Step K1; otherwise, executing Step C.

According to another aspect of the present invention, there is provided a card reader which supports a high speed data communication, which includes:

a first determining module which is configured to determine whether the first in-place identification is valid;

a sending module which is configured to send contactless card in-place information to an upper computer in the case that the first determining module determines that the first in-place identification is valid;

an inquiring card module which is configured to send an inquiring card instruction in a contactless field in the case that the first determining module determines the first in-place identification is invalid;

a receiving module which is configured to receive the inquiring card response data returned from the contactless card after the inquiring module sends the inquiring card instruction in the contactless field;

a speed regulation module which is configured to send the speed regulation setting instruction to the contactless card in the case that the receiving module receives the inquiring card response data returned from the contactless card;

in which the receiving module which is further configured to receive the speed regulation setting successful response data returned from the contactless card after the speed regulation module sends the speed regulation instruction to the contactless card;

a second determining module which is configured to determine whether the receiving module receives speed regulation setting successful response data which is returned from the contactless card;

a setting module which is configured to set the communication speed for sending the first command received to the contactless card as the first communication speed, and to set the communication speed for receiving the operation result returned from the contactless card as the second communication speed, and to set the first in-place identification as valid in the case that the second determining module determines that the receiving module receives the speed regulation setting successful response data returned from the contactless card; and the setting module is further configured to set the communication speed for sending the first command received to the contactless card as the third communication speed, and to set the communication speed for receiving the operation result returned from the contactless card as the fourth communication speed, and to set the first in-place identification as valid in the case that the second determining module determines that the receiving module does not receive the speed regulation setting successful response data returned from the contactless card; the first communication speed is faster than the third communication speed, and the second communication speed is faster than the fourth communication speed;

in which the sending module which is further configured to send card in-place information to the upper computer in the case that the setting module sets the first in-place identification as valid; and the receiving module is further configured to wait for receiving a command sent from the upper computer after the sending module sends the information of contactless card in-place to the upper computer;

a first processing module which is configured to do corresponding operation on the contactless card according to the first command so as to obtain the operation result in the case that the receiving module receives the first command;

in which the sending module which is further configured to send the operation result obtained from the first processing module to the upper computer.

Preferably, the card reader further includes:

a first initializing module which is configured to initialize the first in-place identification as invalid;

a third determining module which is configured to determine whether the first in-place identification is valid in the case that the receiving module receives the first command;

in which the first processing module which is specifically configured to do corresponding operation on the contactless card according to the first command to obtain the operation result in the case that the third determining module determines that the first in-place identification is valid; and the sending module is further configured to send the contactless card leaving information to the upper computer in the case that the third determining module determines that the first in-place identification is invalid so as to trigger the first determining module.

Preferably, the card reader further includes:

a second initializing module which is configured to initialize the first receiving identification as invalid;

a fourth determining module which is configured to determine whether the first receiving identification is valid;

in which the receiving module is specifically configured to wait for receiving the command which is sent from the upper computer in the case that the fourth determining module determines that the first receiving module is invalid;

the first processing module which is further configured to do corresponding operation on the contactless card according to the first command to obtain the operation result in the case that the fourth determining module determines that the first receiving identification is valid; and the setting module which is further configured to set the first receiving identification as valid in the case that the receiving module receives the first command.

Preferably, the card reader further includes:

a fifth determining module which is configured to determine whether the first receiving identification is valid;

a sixth determining module which is configured to determine whether the first command is the obtaining contactless card status instruction in the case that the fifth determining module determines the first receiving identification is valid;

in which the setting module which is further configured to set the first receiving identification as invalid in the case that the sixth determining module determines that the first command is the obtaining contactless card status instruction;

the sending module is further configured to organize the contactless card status information and send the information to the upper computer to trigger the first determining module; and the first determining module which is specifically configured to determine whether the first in-place identification is valid in the case that the fifth determining module determines the first receiving identification is invalid; the first determining module is further configured to determine whether the first in-place identification is valid in the case that the sixth determining module determines the first command is not the obtaining contactless card status instruction.

Preferably, the card reader further includes:

a seventh determining module which is configured to determine whether the contactless card which is operating currently is the first class of card in the case that the second determining module determines that the contactless card supports high-speed data communication and before the first processing module does corresponding operation on the contactless card according to the first command so as to obtain the operation result;

in which the setting module which is further configured to amend parameters of a contactless card reading chip in accordance with the mode of the second class of card to trigger the first processing module in the case that the seventh determining module determines that the contactless card which is operating currently is the first class of card; and the first processing module which is further configured to do corresponding operation on the contactless card according to the first command to obtain the operation result in the case that the seventh determining module determines that the contactless card which is operating currently is not the first class of card.

Preferably, the speed regulation module includes:

a sending unit which is configured to send the speed regulation inquiring instruction before the contactless card sends the speed regulation setting instruction;

a receiving unit which is configured to receive the speed regulation inquiring response data which is returned from the contactless card;

a first determining unit which is configured to determine whether the receiving unit receives the speed regulation inquiring response data which is returned from the contactless card;

a second determining unit which is configured to determine whether the contactless card supports the preset speed or a speed faster than the preset speed after the contactless card is speed regulated in the case that the first determining module determines that the receiving unit receives the speed regulation inquiring response data returned from the contactless;

in which the sending unit is further configured to send the speed regulation setting instruction to the contactless card in the case that the second determining unit determines that the contactless card supports the preset speed and the speed faster than the preset speed after the contactless card is speed regulated; and the setting module which is specifically configured to set the communication speed for sending the first command received to the contactless card as the third communication speed and set the communication speed for receiving the operation result returned from the contactless card as the fourth communication speed, and to set the first in-place identification as valid in the case that the first determining unit determines the receiving unit does not receive the speed regulation response data returned from the contactless card; the setting module is further configured to set the communication speed for sending the first command received to the contactless card as the third communication speed and set the communication speed for receiving the operation result returned from the contactless card as the fourth communication speed, and to set the first in-place identification as valid in the case that the second determining unit determines that the contactless card does not support the preset speed and the speed which is faster than the preset speed after the contactless card is speed regulated.

Preferably, the second determining unit is specifically configured to parse the speed regulation inquiring response data received, determine whether the preset speed is faster than the sending speed and the receiving speed which are supported by the contactless card which is speed regulated.

Preferably, the speed regulation module further includes:

a third determining unit which is configured to determine whether the fastest speed supported by the contactless card which is speed regulated is faster than the fastest speed supported by the card reader, if yes, the fastest speed supported by the card reader is made as a consulted communication speed, the sending unit is triggered; otherwise, the fastest speed supported by the contactless is made as the consulted communication speed, and the sending unit is triggered.

Preferably, the third determining unit includes:

a first determining sub-unit which is configured to determine whether the fastest sending speed supported by the contactless card which is speed regulated is faster than the fastest receiving speed supported by the card reader; and an acting sub-unit which is configured to make the fastest receiving speed supported by the card reader as the consulted receiving speed and trigger a second determining sub-unit in the case that the first determining sub-unit determines that the fastest sending speed supported by the contactless card which is speed regulated is faster than the fastest receiving speed supported by the card reader; the acting sub-unit is further configured to make the fastest sending speed supported by the contactless card as the consulted communication speed and trigger the second determining sub-unit in the case that the first determining sub-unit determines that the fastest sending speed supported by contactless card which is speed regulated is not faster than the fastest receiving speed supported by the card reader;

in which the second determining sub-unit which is configured to determine whether the fastest receiving speed supported by the contactless card which is speed regulated is faster than the fastest sending speed supported by the card reader; and the acting sub-unit which is further configured to make the fastest receiving speed supported by the contactless card as the consulted sending speed and trigger the sending unit in the case that the second determining sub-unit determines that the fastest receiving speed supported by the contactless card which is speed regulated is faster than the fastest sending speed supported by the card reader; the acting sub-unit is further configured to make the fastest receiving speed as the consulted sending speed and trigger the sending unit in the case that the second determining sub-unit determines the fastest receiving speed supported by the contactless card which is speed regulated is not faster than the fastest sending speed supported by the card reader.

Preferably, in the setting module, the communication speed for sending the first command received to the contactless card is set as the first communication speed, the communication speed for receiving the operation result returned from the contactless card is set as the second communication speed, and the setting module is specifically configured to set the communication speed for sending the first command received to the contactless card as the consulted sending speed, and set the communication speed for receiving the operation result returned from the contactless card as the consulted receiving speed.

Preferably, the card reader further includes:

an eighth determining module which is configured to determine whether the second in-place identification is valid;

in which the sending module which is further configured to send the contact card in-place information to the upper computer in the case that the eighth determining module determines that the second in-place identification is valid; and the eighth determining module which is further configured to determine whether the second in-place identification is valid in the case that the eighth determining module determines that the second in-place identification is invalid; and a second processing module which is configured to do corresponding operation on the contact card according to the second command to obtain an operation result in the case that the second command is received from the receiving module;

in which the sending module is further configured to send the operation result obtained from the second processing module to the upper computer to trigger the eighth determining module.

Preferably, the card reader further includes:

a third initializing module which is configured to initialize the second in-place identification as invalid, and to initialize the second receiving identification as invalid; and a ninth determining module which is configured to determine whether the second in-place identification is valid before the second processing module does corresponding operation on the contact card according to the second command to obtain the operation result;

in which the sending module which is further configured to send the contact card leaving information to the upper computer to trigger the eighth determining module in the case that the ninth determining module determines that the second in-place identification is invalid;

the second processing module which is specifically configured to do corresponding operation on the contact card according to the second command to obtain the operation result in the case that the ninth determining module determines that the second in-place identification is valid; and the setting module which is further configured to set the second receiving identification as valid in the case that the receiving module receives the second command.

Preferably, the card reader further includes:

a tenth determining module which is configured to determine whether the second receiving identification is valid;

in which the eighth determining module is specifically configured to determine whether the second in-place identification is valid in the case that the tenth determining module determines the second receiving identification as invalid;

an eleventh determining module which is configured to determine whether the second command is the obtaining contact card status instruction in the case that the tenth determining module determines that the second receiving identification is valid;

in which the setting module is further configured to set the second receiving identification as invalid in the case that the eleventh determining module determines that the second command is the obtaining contact card status instruction;

the sending module is further configured to organize contact card status information and send the information to the upper computer to trigger the eighth determining module; and the ninth determining module is specifically configured to determine whether the second in-place identification is valid in the case that the eleventh determining module determines that the second command is not the obtaining contact card status instruction.

According to the present invention, it shortens the time period for interaction between a contactless card reader and a contactless card by improving the communication speed between the contactless card reader and the contactless card, in this way, it is more convenient for users.

BRIEF DESCRIPTION OF THE DRAWINGS

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

DETAILED DESCRIPTION OF EMBODIMENTS

While preferred embodiments of the present invention have been shown and described herein, it will obvious that such embodiments are provided by way of example only. Numerous variations, changes, and substitutions which occur to those skilled in the art without departing from the invention belong to the scope of the present invention.

In the present invention, the card reader which supports high-speed data communication can not only process operation between it and the contactless card in a high-speed communication mode, but also process operation between it and the contact card in a regular speed communication mode.

Embodiment 1

Figure 1:
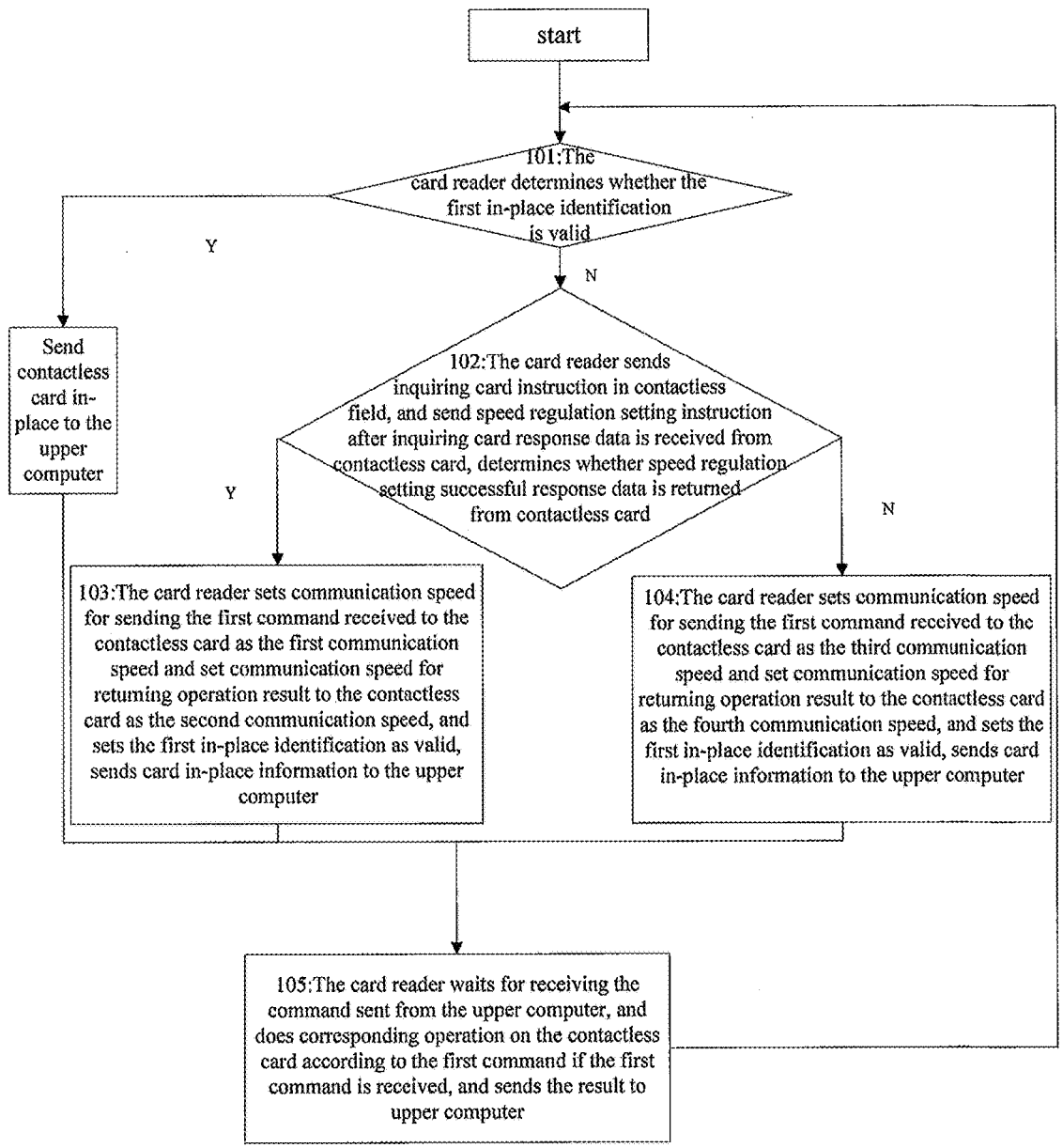
FIG. 1 provides flow chart of a working method of a card reader supporting high-speed data communication according to Embodiment 1.

It provides a working method of a card reader which supports high-speed data communication according to Embodiment 1, as shown in FIG. 1, which includes:

Step 101, the card reader determines whether a first in-place identification is valid, if yes, sends contactless card in-place information to the upper computer, and executes Step 105; otherwise, executes Step 102;

in Embodiment 1, before Step 101, the method further includes: the card reader initializes the first in-place identification as invalid, and initializes a first receiving identification as invalid;

in Embodiment 1, before Step 101, the method further includes:

Step A1, the card reader determines whether the first receiving identification is valid, if yes, executes Step A2; otherwise, executes Step 101;

Step A2, the card reader determines whether a first command is an obtaining contactless card status instruction, if yes, executes Step A3; otherwise, executes Step 101;

in Embodiment 1, the first command is a contactless-card-process-CCID command;

Step A3, the card reader sets the first receiving identification as invalid, organizes contactless card status information to send the information to the upper computer, and goes to Step 101.

Step 102, the card reader sends an inquiring card instruction in a contactless field, and sends a speed regulation setting instruction to the contactless card after inquiring card response data returned from the contactless card is received, and determines whether speed regulation setting successful response data returned from the contactless card is received, if yes, goes to Step 103; otherwise, goes to Step 104;

In Embodiment 1, before the card reader sends the speed regulation setting instruction to the contactless card, the method further includes:

Step A1', the card reader sends a speed regulation inquiring instruction to the contactless card, and determines whether the speed regulation inquiring response data returned from the contactless card is received, if yes, goes to Step A2; otherwise, the contactless card does not support high speed data communication, and goes to Step 104; and Step A2', the card reader determines whether the contactless card supports a preset speed and a speed which is faster than the preset speed after the contactless card is speed regulated according to the speed regulation inquiring response data, if yes, sends the speed regulation setting instruction to the contactless card; otherwise, the contactless card does not support high speed data communication, and goes to Step 104;

Specifically, the card reader parses the received speed regulation inquiring response data, and determines whether the preset speed is faster than a sending speed and a receiving speed which are supported by the contactless card which is speed regulated, if yes, the contactless card does not support high speed data communication, and Step 104 is executed; otherwise, sends the speed regulation setting instruction to the contactless card;

Furthermore, in Embodiment 1, after Step A2, the method further includes:

Step B, the card reader determines whether the fastest speed supported by the contactless card which is speed regulated is faster than the fastest speed supported by the card reader, if yes, the fastest speed supported by the card reader is made as a consulted communication speed, the speed regulation setting instruction is sent to the contactless card; otherwise, the fastest speed supported by the contactless card is made as the consulted communication speed, and the speed regulation setting instruction is sent to the contactless card;

in Embodiment 1, Step B specifically includes:

Step B-1, the card reader determines whether the fastest sending speed supported by the contactless card which is speed regulated is faster than the fastest receiving speed supported by the card reader, if yes, the fastest receiving speed supported by the card reader is made as the consulted receiving speed, and Step B-2 is executed; otherwise, the fastest sending supported by the contactless card is made as the consulted receiving speed, and Step B-2 is executed; and Step B-2, the card reader determines whether the fastest receiving speed supported by the contactless card which is speed regulated is faster than the fastest sending speed supported by the card reader, if yes, the fastest sending speed supported by the card reader is made as a consulted sending speed, the speed regulation setting instruction is sent to the contactless card; otherwise, the fastest receiving speed supported by the contactless card is made as the consulted sending speed, and the speed regulation setting instruction is sent to the contactless card.

Step 103, the card reader sets its communication speed for sending the first command received to the contactless card as a first communication speed, and set its communication speed for receiving an operation result returned from the contactless card as a second communication speed, sets the first in-place identification as valid, sends the card in-place information to the upper computer, and executes Step 105;

specifically, the card reader sets the communication speed for sending the first command received to the contactless card as the consulted sending speed, sets the communication speed for receiving the operation result returned from the contactless card as the consulted receiving speed;

in Embodiment 1, the first communication speed can equal or unequal to the second communication speed.

Step 104, the card reader sets the communication speed for sending the first command received to the contactless card as a third communication speed, and sets the communication speed for receiving the operation result returned from the contactless card as a fourth communication speed, and sets the first in-place identification as valid, sends the card in-place information to the upper computer, and goes to Step 105;

in Embodiment 1, the first communication speed is greater than the third communication speed; while the second communication speed is greater than the fourth communication speed.

Step 105, the card reader waits for receiving a command from the upper computer, does corresponding operation on the contactless card according to the first command when the command received is the first command so as to obtain an operation result, and sends the operation result to the upper computer, and returns to Step 101.

In Embodiment 1, before Step 105, the method further includes: the card reader determines whether the first receiving identification is valid, if yes, does operation on the contactless card to obtain the operation result according to the first command, and sends the operation result to the upper computer, and returns to Step 101; otherwise, goes to Step 105;

in Embodiment 1, in Step 105, in the case that the card reader receives the first command, the method further includes that the card reader sets the first receiving identification as valid;

furthermore, in Embodiment 1, in the case that the speed regulation setting successful response data is received in Step 102, before the card reader does operation on the contactless card according to the first command to obtain the operation result in Step 105, the method further includes: the card reader determines whether the contactless which is currently operating by the card reader is a first class of card, if yes, amends parameters of a contactless card reading chip in accordance with a mode of a second class of card, and then does operation on the contactless card according to the first command to obtain the operation result; otherwise, operates on the contactless card according to the first command to obtain the operation result;

preferably, in Embodiment 1, the first class of card is TYPE A card, the second class of card is TYPE B card;

in Embodiment 1, the method further includes:

Step K1, the card reader determines whether the second in-place identification is valid, if yes, sends contact card in-place information to the upper computer, goes to Step K2; otherwise, returns to Step K1; and Step K2, the card reader waits for receiving a command sent from the upper computer, operates on the contact card according to the second command to obtain an operation result, and sends the operation result to the upper computer, and returns to Step K1.

In Embodiment 1, the second command is a contact-card-processing-CCID command.

Embodiment 2

Figure 2A:
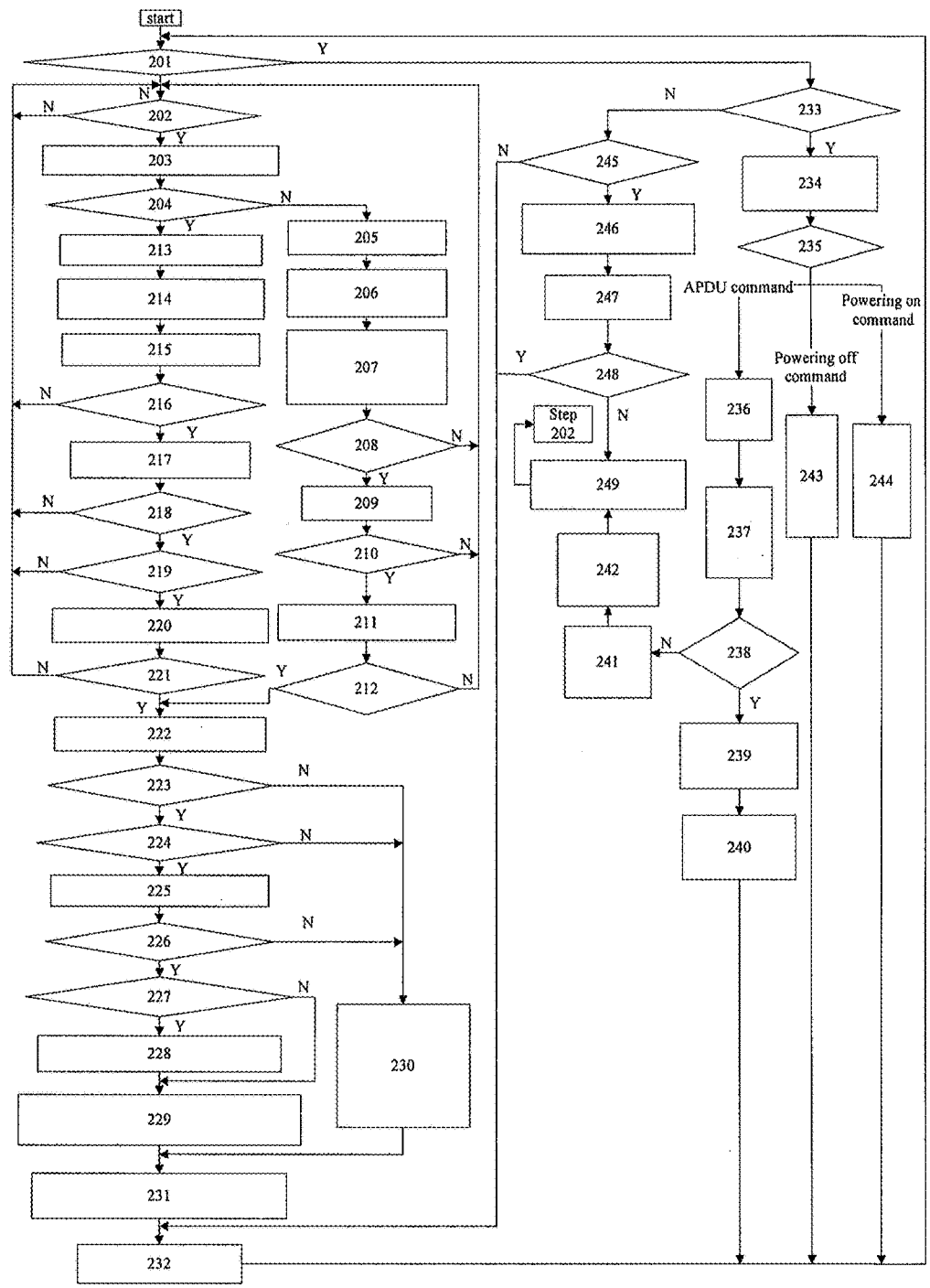
FIG. 2 (composed of FIG. 2A, FIG. 2B, and FIG. 2C) provides a flow chart of an operation to a contactless card in a working method of a card reader supporting high-speed data communication according to Embodiment 2.

It provides a process of operations on a contactless card in a working method of a card reader which supports high speed data communication according to Embodiment 2, as shown in FIG. 2, which includes:

Step 201, the card reader determines whether the first in-place identification is valid, if yes, goes to Step 233; otherwise, goes to Step 202;

in Embodiment 2, before Step 201, the process further includes: the card reader is initialized;

specifically, the first in-place identification is initialized as invalid, a first receiving identification is initialized as invalid, a timer value of a timer is initialized, a contactless card reading chip is initialized.

Step 202, the card reader determines whether the timer value of the time reaches a time for inquiring card, if yes, goes to Step 203; otherwise, continues to execute Step 202;

Step 203, the time for inquiring card is set by the card reader as the timer value of the timer plus a preset value;

for instance, the time for inquiring card is set by the card reader as the timer value of the timer plus 100.

Step 204, the card reader determines whether an inquiring command sent this time is a TYPE A card inquiring card instruction, if yes, goes to Step 213; otherwise, goes to Step 205;

Step 205, the card reader sets an inquiring card identification as TYPE A card;

in Embodiment 2, a TYPE A card inquiring card mode and a TYPE B card inquiring card mode are conducted alternatively, for instance, the TYPE B card inquiring card mode is conducted this time, and the TYPE A card inquiring card mode is conducted the next time.

Step 206, parameters of the contactless card reading chip are set by the card reader in accordance with the TYPE B mode;

in Embodiment 2, because it is the TYPE B card inquiring card mode this time, a corresponding working mode of the card reader is the TYPE B card mode;

specifically, the parameters of the contactless card reading chip which is set by the card reader in accordance with TYPE B card mode includes a current mode, a dual-directional communication speed, a modulation depth, a delay time for waiting for receiving information, a timeout time for waiting for a response;

preferably, the card reader sets the current mode as the TYPE B mode, sets the dual-directional communication speed as 106 kbps, sets the modulation depth as 10%, the delay time for waiting for receiving information is set as 10 seconds, the timeout time for waiting for a response is set as 21186 seconds.

Step 207, the card reader sends a TYPE B card inquiring card instruction in a contactless field, and executes anti-collision and selection based on time slot;

in Embodiment 2, both of the instruction sent from the card reader to the contactless card and a response instruction returned by the contactless card which is received from the card reader are demonstrated in a hexadecimal;

furthermore, in Embodiment 2, data at the last two bytes in the TYPE B card inquiring card instruction is a check code of 14443-4 layer TYPE B card, in Embodiment 2, all of the check codes of two bytes which relates to the TYPE B below are demonstrated as CRC-B;

specifically, the TYPE B card inquiring card instruction which is sent from the card reader in the contactless card is 05 00 00 00+CRC-B.

Step 208, the card reader determines whether TYPE B card inquiring card response data returned by the contactless card is received, if yes, goes to Step 209; otherwise, returns to Step 202;

in Embodiment 2, in the TYPE B card inquiring card response data returned by the contactless card, data at bytes from the second byte to the fifth byte is an unique identification of the card, data at bytes from the tenth byte to the twelfth byte is consulted data, data at the last two bytes is the check code of 14443-4 layer TYPE B card;

preferably, in Embodiment 2, the card reader receives the TYPE B card inquiring card response data returned by the contactless card, and the received TYPE B card inquiring card response data specifically is 50 23 45 67 89 00 00 00 00 00 81 A1+CRC-B;

in the above TYPE B card inquiring card response data, 23 45 67 89 is the unique identification of the card, 00 81 A1 is the consulted data.

Step 209, the card reader records information of the contactless card;

in Embodiment 2, the card reader records the information of the contactless card according to the inquiring card response data returned by the contactless card;

specifically, the card reader recording the information of the contactless card includes that the card reader records a communication speed supported by the contactless card, records a length of a largest frame supported by the contactless card, records an integer of frame waiting time of the contactless card, and records a frame delay time from the contactless card to the card reader;

in Embodiment 2, the information of the contactless card recorded by the card reader according to the TYPE B card inquiring card response data which is returned from the contactless card includes: the dual-directional communication speed supported by the contactless card 106 kbps, the length of the largest frame supported by the contactless card is 256 bytes, the integer of frame waiting time of the contactless card is 0 Ah, the frame delay time from the contactless card to the card reader which is 0 second.

Step 210, the card reader determines whether the contactless card supports the 14443-4 layer protocol, if yes, goes to Step 211; otherwise, returns to Step 202;

in Embodiment 2, the card reader determining whether the contactless card supports the 14443-4 layer protocol specifically is that the card reader parses the TYPE B card inquiring card response data returned by the contactless card, and determines whether the least significant bit of the second byte in the consulted data, if yes, the contactless card supports 14443-4 layer protocol; otherwise, the contactless card does not support 14443-4 layer protocol;

in Embodiment 2, the card reader parses the TYPE B card inquiring card response data returned by the contactless card, in which, the least significant bit of the second byte 81 of the consulted data 00 81 A1 is 1, thus, the contactless card supports 14443-4 layer protocol.

Step 211, the card reader sends a TYPE B card selection instruction to the contactless card;

in Embodiment 2, data at bytes from the second byte to the fifth byte in the TYPE B card selection instruction is the unique identification of the card, and data at the last two bytes is the check code of 14443-4 layer TYPE B card;

in Embodiment 2, the TYPE B card selection instruction sent from the card reader to the contactless card specifically is 1D 23 45 67 89 00 0C 01 00+CRC-B.

Step 212, the card reader determines whether TYPE B card selection instruction response data returned from the contactless card is received, if yes, goes to Step 222; otherwise, returns to Step 202;

in Embodiment 2, in the case that the TYPE B card selection instruction response data returned from the contactless card is received, before Step 222, the process further includes the card reader parses the received TYPE B card selection instruction response data returned from the contactless card, the contactless card enters 14443-4 layer successfully in the case that the first byte of the received response data is 0, and then goes to Step 222; otherwise, the contactless card fails to enter 14443-4 layer, and returns to Step 202.

Step 213, the card reader sets the inquiring card identification as TYPE B card;

specifically, a TYPE A card inquiring card mode and a TYPE B card inquiring card mode are executed alternatively, for instance, the TYPE A card inquiring card mode is executed this time, the TYPE B card inquiring card mode is executed the next time.

Step 214, the card reader sets parameters of the contactless card reading chip in accordance with TYPE A card mode;

in Embodiment 2, a working mode of the card reader corresponding to TYPE A card inquiring card mode is TYPE A card mode, and the parameters of the contactless card reading chip set by the card reader according to TYPE A card mode include the current mode, the dual-directional communication speed, the delay time for waiting for receiving information, and the timeout time of waiting for response;

preferably, the card reader sets the current mode as TYPE A card mode, sets the dual-directional communication speed as 106 kbps, sets the delay time for waiting for receiving information as 10 seconds, and sets the timeout time for waiting for response as 21186 seconds.

Step 215, the card reader sends the TYPE A card inquiring card instruction in the contactless field;

in Embodiment 2, the TYPE A card inquiring card instruction sent from the card reader in the contactless field is 26.

Step 216, the card reader determines whether TYPE A card inquiring card response data returned from the contactless card is received, if yes, goes to Step 217; otherwise, returns to Step 202;

in Embodiment 2, the inquiring card response data returned from the contactless card received from the card reader includes:

00 which means a length of the unique identification of the card of the contactless card is 4 bytes;

01 which means the length of the unique identification of the card of the contactless card is 7 bytes;

10 which means the length of the unique identification of the card of the contactless card is 10 bytes;

11 which means reserving and putting into use in the future;

preferably, in Embodiment 2, the inquiring card response data returned from the contactless card received from the card reader is 00.

Step 217, the card reader executes bit-based anti-collision and selection on the contactless card;

in Embodiment 2, before Step 217, the process further includes: the card reader sends an obtaining-card-unique-identification instruction to the contactless card, and obtains the unique identification of the card of the contactless card; and goes to Step 217 in the case that the card reader receives the unique identification of the card returned from the contactless card;

in Embodiment 2, Step 217 specifically includes that the card reader sends a TYPE A card anti-collision and selection instruction to the contactless card;

furthermore, in Embodiment 2, data at bytes from the third byte to the sixth byte in the TYPE A card anti-collision and selection instruction is the unique identification of the card, data at the last two bytes is a check code of the 14443-4 layer TYPE A card, in Embodiment 2, all of the check codes of two byte below, which relates to TYPE A card, are demonstrated as CRC-A.

specially, in Embodiment 2, the obtaining-card-unique-identification instruction sent from the card reader to the contactless card is 93 20;

preferably, the unique identification of the card returned from the contactless card received from the card reader is 12 34 56 78;

the TYPE A card anti-collision and selection instruction sent from the card reader to the contactless card is 93 70 12 34 56 78+CRC-A.

Step 218, the card reader determines whether the anti-collision and the selection are successfully executed, if yes, goes to Step 219; otherwise, returns to Step 202;

specifically, the card reader determines whether TYPE A card anti-collision and selection instruction response data returned from the contactless card is received, if yes, the anti-collision and selection is successful; otherwise, the anti-collision and selection fails;

in Embodiment 2, the data at the last two bytes in TYPE A card anti-collision and selection instruction response data is the check code of 14443-4 layer TYPE A card;

preferably, in Embodiment 2, the card reader receives the TYPE A card anti-collision and selection instruction response data returned from the contactless card, and the received TYPE A card anti-collision and selection instruction response data specifically is 00+CRC-A.

Step 219, the card reader determines whether the contactless card supports the 14443-4 layer protocol, if yes, goes to Step 220; otherwise, returns to Step 202;

specifically, the card reader parses the TYPE A card anti-collision and selection instruction response data, which is hexadecimal, returned from the contactless card, determines whether data at the sixth byte is 0 in the case that the first byte transfers to duodecimal, if yes, the contactless card supports the 14443-4 layer protocol; otherwise, the contactless card does not support the 14443-4 layer protocol.

Step 220, the card reader sends a TYPE A card selection instruction to the contactless card; in Embodiment 2, the data at the last bytes in the TYPE A card selection instruction is the check code of the 14443-4 layer TYPE A card, the TYPE A card selection instruction sent from the card reader to the contactless card specifically is E0 C0+CRC-A.

Step 221, the card reader determines whether the TYPE A card selection instruction response data returned from the contactless card is received, if yes, goes to Step 222; otherwise, returns to Step 202;

specifically, the card reader determines whether the selection instruction response data returned from the contactless card is received, if yes, the contactless card enters 14443-4 layer successfully, Step 222 is executed; otherwise, the contactless card enters 14443-4 layer unsuccessfully, Step 202 is returned to;

furthermore, in Embodiment 2, the third byte in the TYPE A card selection instruction response data means the communication speed supported by the contactless card;

preferably, in Embodiment 2, the card reader receives the TYPE A card selection instruction response data returned from the contactless card, the response data specifically is 0F 78 00 AA 02 54 46 44 15 FF BC FF FF FF FF;

the data at the third byte in the above TYPE A card selection instruction response data means the dual-directional communication speed supported by the contactless card is 106 kbps.

Step 222, the card reader sends an S block speed regulation inquiring instruction to the contactless card;

preferably, in Embodiment 2, the contactless card is TYPE A card, the S block speed regulation inquiring instruction sent from the card reader to the contactless card is F0 A0 02 A1 00'+CRC-A.

Step 223, the card reader determines whether the speed regulation inquiring response data returned from the contactless card is received, if yes, goes to Step 224; otherwise, goes to Step 230;

in Embodiment 2, in the speed regulation inquiring response data, data at the eighth byte is a receiving speed code supported by the card, and data at the twelfth byte is a sending speed code supported by the card, data at the last two bytes is the check code of the 14443-4 layer TYPE A card;

preferably, in Embodiment, the card reader receives the speed regulation inquiring response data returned from the contactless card, and the speed regulation inquiring response data received specifically is F0 A0 0A A2 08 80 02 31 00 81 02 31 00'+CRC-A;

the above speed regulation inquiring response data means the contactless card, which is speed regulated, can support the communication speeds of 1.6 kbps, 1.7 Mbps, and 3.4 Mbps, specifically, data 31 at the eighth byte means the receiving speeds, supported by the contactless card which is speed regulated, are 1.6 kbps, 1.7 Mbps, and 3.4 Mbps, data 31 at the twelfth byte means the sending speeds, supported by the contactless card which is speed regulated, are 1.6 kbps, 1.7 Mbps, and 3.4 Mbps.

Step 224, the card reader determines whether the contactless card, which is speed regulated, supports a preset speed and a transmission speed faster than the preset speed, if yes, goes to Step 225; otherwise, goes to Step 230;

preferably, in Embodiment 2, the preset speed is 1.7 Mbps;

specifically, Step 224 is the card reader parses the speed inquiring response data returned from the contactless card, and determines whether both of the receiving speed and the sending speed of the contactless card, which is speed regulated, support 1.7 Mbps and the transmission speed faster than 1.7 Mbps, if yes, goes to Step 225; otherwise, goes to Step 230.

Step 225, the card reader sends an S block speed regulation setting instruction to the contactless card;

in Embodiment 2, before Step 225, the process further includes:

Step a1, the card reader determines whether the fastest sending speed supported by the contactless card which is speed regulated is faster than the fastest receiving speed supported by the card reader, if yes, the fastest receiving speed supported by the card reader is made as a consulted receiving speed, and Step a2 is executed; otherwise, the fastest sending speed supported by the contactless card is made as the consulted receiving speed, and Step a2 is executed; and Step a2, the card reader determines whether the fastest receiving speed supported by the contactless card which is speed regulated is faster than the fastest sending speed supported by the card reader, if yes, the fastest sending speed supported by the card reader is made as the consulted sending speed, and Step 225 is executed; otherwise, the fastest receiving speed supported by the contactless card is made as the consulted sending speed, and Step 225 is executed;

in Embodiment 2, the sending speed supported by the card reader is ranged from 1.7 Mbps to 6.8 Mbps, the receiving speed supported by the card reader is ranged from 1.7 Mbps to 3.4 Mbps;

in Embodiment 2, the fastest sending speed supported by the contactless card, which is 3.4 Mbps, is made as the consulted receiving speed, and the fastest sending speed supported by the contactless card, which is 3.4 Mbps, is made as the consulted sending speed according to the received speed regulation inquiring response data, in this way, the contactless card must communicate data in a dual-directional speed of 3.4 Mbps;

furthermore, in Embodiment 2, data at the eighth byte in the S block speed regulation setting instruction is the speed code of the consulted sending speed, data at the twelfth byte is the speed code of the consulted receiving speed, the data at the last two bytes is the check code of the 14443-4 layer TYPE A card;

in Embodiment 2, the S block speed regulation setting instruction sent from the card reader to the contactless card specifically is F0 A0 0A A3 08 83 02 20 00 84 02 20 00'+CRC-A;

in the above S block speed regulation setting instruction, the data at the eighth byte 20 means the consulted sending speed is 3.4 Mbps, that is, the contactless card sets its receiving speed as 3.4 Mbps, the data at the twelfth byte 20 means the consulted receiving speed is 3.4 Mbps, that is, the contactless card sets its sending speed as 3.4 Mbps.

Step 226, the card reader determines whether the speed regulation setting successful response returned from the contactless card is received, if yes, goes to Step 227; otherwise, goes to Step 230;

specifically, in the case that the S block speed regulation setting instruction response data returned from the contactless card is F0 A0 02 A4 00'+CRC-A, the setting is successful; otherwise, the setting fails.

Step 227, the card reader determines whether the contactless card which is currently operating is TYPE A card, if yes, goes to Step 228; otherwise, goes to Step 229;

specifically, the card reader determines whether a current status of parameters of a card reading chip is TYPE A card mode, if yes, the contactless card currently operated is TYPE A card; otherwise, the contactless card currently operated is not TYPE A card;

preferably, in Embodiment 2, the contactless card is TYPE A card.

Step 228, the card reader amends parameters of the contactless card reading chip according to TYPE B;

in Embodiment 2, the communication between the contactless card and the card reader is in a high speed communication mode which is faster than 1.7 Mbps, and the high speed communication mode is TYPE B card mode;

in Embodiment 2, the parameters of the contactless card reading chip amended by the card reader according to TYPE B card mode includes a current mode, a modulation depth, a delay time for waiting for receiving information, and a timeout time for waiting for a response;

preferably, the current mode is amended by the card reader as the TYPE B card mode, the modulation depth is set by the card reader as 10%, the delay time for waiting for receiving information is amended as 10 seconds, and the timeout time for waiting for a response is amended as 21186 seconds.

Step 229, the card reader sets the communication speed for sending the received CCID command to the contactless card as the first communication speed, and sets the communication speed for receiving an operation result returned from the contactless card as the second communication speed;

in Embodiment 2, the first communication speed can equal or unequal to the second communication speed;

specifically, in Embodiment 2, the card reader sets the communication speed for sending the received CCID command to the contactless card as 3.4 Mbps, and sets the communication speed for receiving the operation result returned from the contactless card as 3.4 Mbps.

Step 230, the card reader sets the communication speed for sending the received CCID command to the contactless card as a third communication speed, and sets the communication speed for receiving the operation result returned from the contactless card as a fourth communication speed;

in Embodiment 2, the first communication speed is faster than the third communication speed, the second communication speed is faster than the fourth communication speed;

specifically, in Embodiment 2, the card reader sets the communication speed for sending the receiving CCID command to the contactless card as 106 kbps, and sets the communication speed for receiving the operation result returned from the contactless card as 106 kbps;

Step 231, the card reader sets the first in-place identification as valid, sets the card in-place information to the upper computer, and sets a time of checking card in the field as a timer value of the timer plus a preset value;

for instance, the card reader sets the time of checking card in the field as the timer value of the time plus 100.

Step 232, the card reader waits for receiving the CCID command sent from the upper computer, and returns to Step 201;

in Embodiment 2, in the case that the card reader receives the CCID command sent from the upper computer, before returning to Step 201, the process further includes that the card reader sets the first receiving identification as valid.

Step 233, the card reader determines whether the first receiving identification is valid, if yes, goes to Step 234; otherwise, goes to Step 245;

Step 234, the card reader sets the first receiving identification as invalid;

Step 235, the card reader determines a type of the CCID command, goes to Step 236 in the case that the CCID command is an APDU command; goes to Step 243 in the case that the CCID command is a power off command; goes to Step 244 in the case that the CCID command is a power on command;

Step 236, the card reader extracts valid information from the APDU command;

Step 237, the card reader sends the valid information to the contactless card;

Step 238, the card reader determines whether APDU response data returned from the contactless card is received, if yes, goes to Step 239; otherwise, goes to Step 241;

Step 239, the card reader extracts the valid information from the APDU response data to compose CCID response data;

Step 240, the card reader sends CCID response data to the upper computer, and returns to Step 201;

Step 241, the card reader organizes APDU error response data;

Step 242, the card reader sends the APDU error response data to the upper computer, and goes to Step 249;

Step 243, the card reader organizes power off response data and returns the power off response data to the upper computer, and returns to Step 201;

Step 244, the card reader organizes power on response data and returns the power on response data to the upper computer, and returns to Step 201;

Step 245, the card reader determines whether the timer value of the timer reaches the time of contactless card leaving, if yes, goes to Step 246; otherwise, returns to Step 232;

Step 246, the card reader sets the time of contactless card in the field as the timer value of the timer plus the preset value;

for instance, the card reader sets the time of contactless card in the field as the timer value of timer plus 100.

Step 247, the card reader sends R block which includes negative response to the contactless card;

specifically, the card reader sends R block which includes negative response to the contactless card to check whether the contactless card leaves, the contactless card sends the R block response data to the card reader in the case that the contactless card does not leave.

Step 248, the card reader determines whether the R block response data returned from the contactless card is received, if yes, returns to Step 232; otherwise, goes to Step 249;

Step 249, the card reader sets the first in-place identification as invalid, and sends the contactless card leaving information to the upper computer, and returns to Step 202.

In Embodiment 2, in the case that the operation system of the upper computer is Linux operating system, before Step 201, the process further includes:

Step F1, the card reader determines whether the first receiving identification is valid, if yes, goes to Step F2; otherwise, goes to Step 201;

Step F2, the card reader determines whether the CCID command received is the obtaining contactless card status command, if yes, goes to Step F3; otherwise, goes to Step 201;

Step F3, the card reader sets the first receiving identification as invalid; and Step F4, the card reader organizes the contactless card status information to return the information to the upper computer, and goes to Step 201.

In Embodiment 2, specifically, the contactless card status information is whether the card is in place.

Embodiment 3

Figure 3:
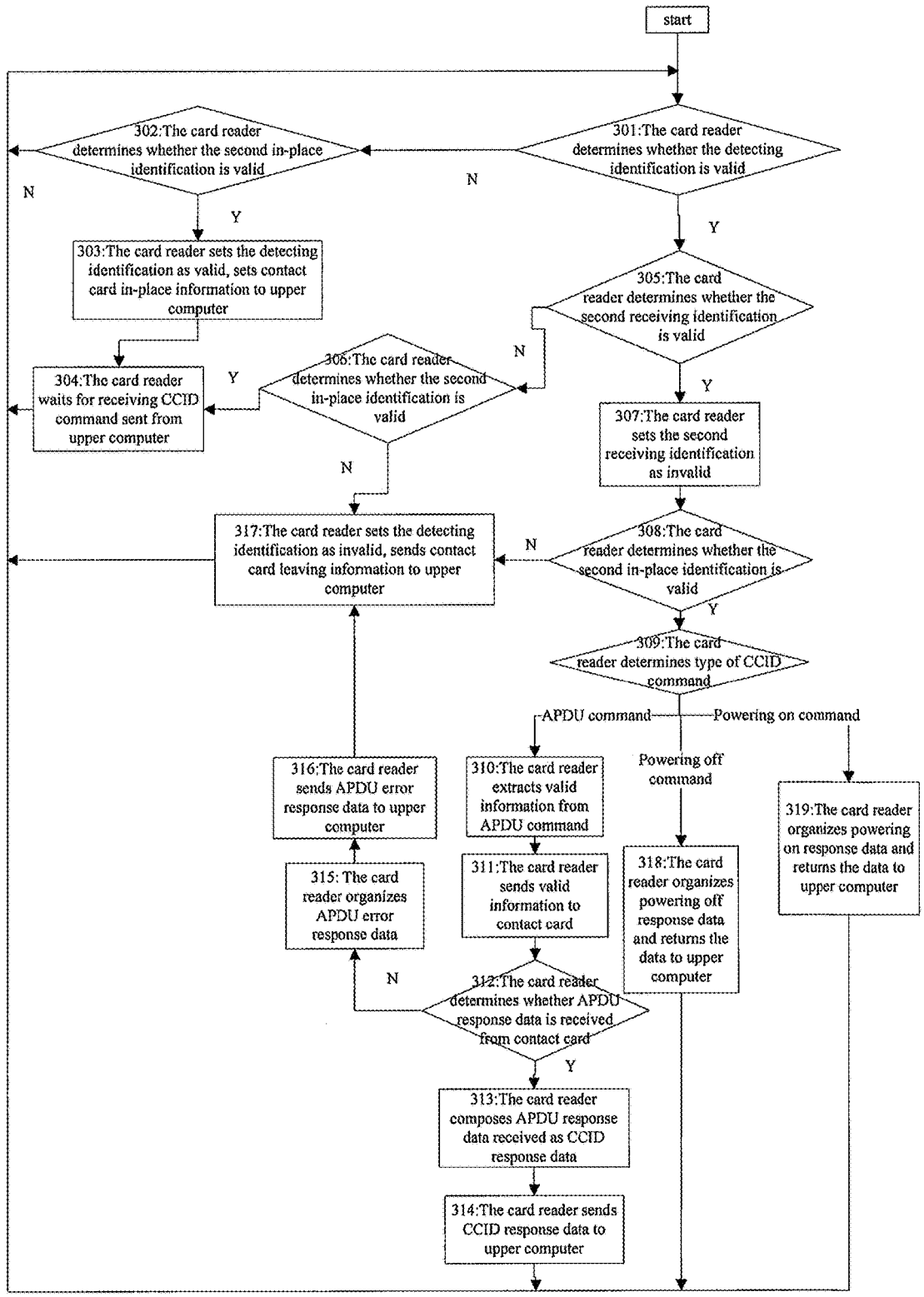
FIG. 3 provides a flow chart of an operation to a contact card in a working method of a card reader supporting high-speed data communication according to Embodiment 3.

It provides a process of operations on a contact card in a working method of a card reader which supports high speed data communication according to Embodiment 3, as shown in FIG. 3, which includes:

Step 301, the card reader determines whether a checking identification is valid, if yes, goes to Step 305; otherwise, goes to Step 302;

in Embodiment 3, before Step 301, the process further includes that the card reader is initialized;

specifically, the card reader initializes a test identification as invalid, initializes a second in-place identification as invalid, and initializes a second receiving identification as invalid;

furthermore, in Embodiment 3, before Step 301, the process further includes: the card reader tests whether the contact card is inserted in a card slot, and sets the test identification as valid in the case that the contact card is in the card slot.

Step 302, the card reader determines whether the second in-place identification is valid, if yes, goes to Step 303; otherwise, returns to Step 301;

in Embodiment 3, the second in-place identification means that the contact card is inserted into the card slot and is in-place;

specifically, in the case that the contact card is inserted into the card slot and is in-place, the status of the second in-place identification is changed as valid automatically because of the mechanical strength of the contact card being inserted into the card slot.

Step 303, the card reader sets the test identification as valid, and sends the contact card in-place information to the upper computer;

Step 304, the card reader waits for receiving the CCID command sent from the upper computer, and returns to Step 301;

in Embodiment 3, in the case that the card reader receives the CCID command sent from the upper computer, before returning to Step 301, the process further includes: the card reader sets the second receiving identification as valid.

Step 305, the card reader determines whether the second receiving identification is valid, if yes, goes to Step 307; otherwise, goes to Step 306;

Step 306, the card reader determines whether the second in-place identification is valid, if yes, returns to Step 304; otherwise, goes to Step 317;

Step 307, the card reader sets the second receiving identification as invalid;

Step 308, the card reader determines whether the second in-place is valid, if yes, goes to Step 309; otherwise, goes to Step 317;

Step 309, the card reader determines a type of the CCID command, goes to Step 310 in the case that the CCID command is the APDU command; goes to Step 318 in the case that the CCID command is the power-off command; goes to Step 319 in the case that the CCID command is the power-on command;

Step 310, the card reader extracts valid information from the APDU command;

Step 311, the card reader sends the valid information to the contact card;

Step 312, the card reader determines whether APDU response data returned from the contact card is received, if yes, goes to Step 313; otherwise, goes to Step 315;

Step 313, the card reader composes the received APDU response data into CCID response data;

Step 314, the card reader sends the CCID response data to the upper computer, and returns to Step 301;

Step 315, the card reader organizes APDU error response data;

Step 316, the card reader sends the APDU error response data to the upper computer;

Step 317, the card reader sets the test identification as invalid, and sends contact card leaving information to the upper computer, and returns to Step 301;

Step 318, the card reader organizes the power-off response data and returns the power-off response data to the upper computer, and returns to Step 301;

Step 319, the card reader organizes the power-on response data and returns to the power-on response to the upper computer, and returns to Step 301.

In Embodiment 3, in the case that the operation system of the upper computer is Linux operation system, before Step 301, the process further includes:

Step S1, the card reader determines whether the second receiving identification is valid, if yes, goes to Step S2; otherwise, goes to Step 301;

Step S2, the card reader determines whether the received CCID command is an obtaining contactless card status command, if yes, goes to Step S3; otherwise, goes to Step 301;

Step S3, the card reader sets the second receiving identification as invalid; and Step S4, the card reader organizes the contact card status information to the upper computer, and goes to Step 301.

In Embodiment 3, specifically, the contact card status information is whether the card is in-place.

Embodiment 4

Figure 4:
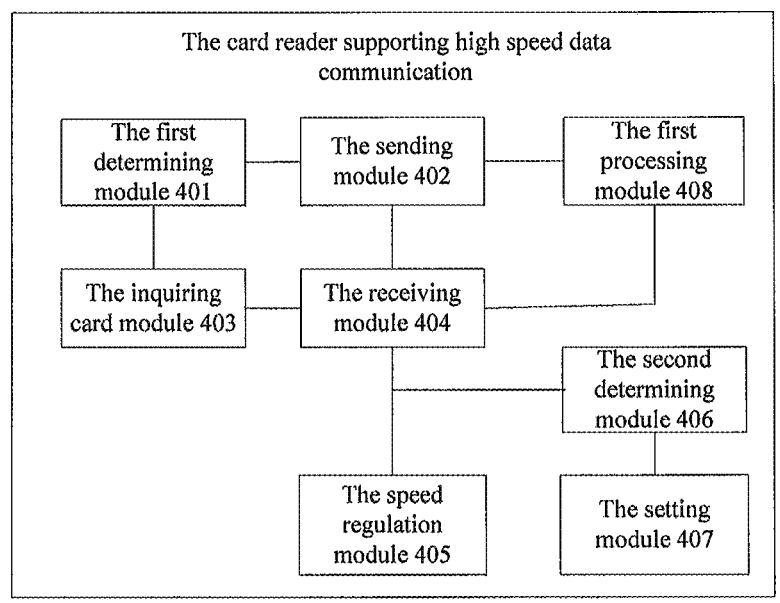
FIG. 4 provides a block diagram of a card reader supporting high-speed data communication according to Embodiment 4.

It provides a card reader which supports high speed data communication according to Embodiment 4, as shown in FIG. 4, the card reader includes:

a first determining module 401 which is configured to determine whether a first in-place identification is valid;

a sending module 402 which is configured to send the contactless card in-place information to an upper computer in the case that the first determining module 401 determines that the first in-place identification is valid;

an inquiring card module 403 which is configured to send an inquiring card instruction in a contactless field in the case that the first determining module 401 determines that the first in-place identification is invalid;

a receiving module 404 which is configured to receive inquiring card response data returned from the contactless card after the inquiring card module 403 sends the inquiring card instruction in the contactless card;

a speed regulation module 405 which is send a speed regulation setting instruction to the contactless card in the case that the receiving module 404 receives the inquiring card response data returned from the contactless card;

in Embodiment 4, the receiving module 404 is further configured to receive speed regulation setting successful response data returned from the contactless card after the speed regulation module 405 sends the speed regulation instruction to the contactless card;

a second determining module 406 which is configured to determine whether the receiving module 404 receives the speed regulation setting successful response data returned from the contactless card;

a setting module 407 which is configured to set the communication speed for sending a first command received to the contactless card as a first communication speed, and set the communication speed for receiving an operation result returned from the contactless card as a second communication speed, and set the first in-place identification as valid in the case that the second determining module 406 determines that the receiving module receives the speed regulation setting successful response data returned from the contactless card; the setting module 407 is further configured to set the communication speed for sending the first command received to the contactless card as a third communication speed, set the communication speed for receiving the operation result returned from the contactless card as a fourth communication speed, and set the first in-place identification as valid in the case that the second determining module 406 determines that the receiving module does not receives the speed regulation setting successful response data returned from the contactless card; the first communication speed is faster than the third communication speed, the second communication speed is faster than the fourth communication speed;

in Embodiment 4, the sending module 402 is further configured to sending the card in-place information to the upper computer in the case that the setting module 407 sets the first in-place identification as valid;

in Embodiment 4, the receiving module 404 is further configured to wait for receiving a command sent from the upper computer in the case that the sending module 402 sends the contactless card in-place information to the upper computer;

a first processing module 408 which is configured to do corresponding operation to the contactless card according to a first command in the case that the receiving module 404 receives the first command so as to obtain an operation result;

in Embodiment 4, the sending module 402 is further configured to send the operation result obtained from the first processing module 408 to the upper computer.

In Embodiment 4, the card reader further includes: a first initializing module which is configured to initialized the first in-place identification as invalid;

a third determining module which is configured to determine the first in-place identification as valid in the case that the receiving module 404 receives the first command;

in Embodiment 4, the first processing module 408 is specifically configured to do corresponding operation on the contactless card according to the first command in the case that the third determining module determines the first in-place identification as valid to obtain the operation result; and in Embodiment 4, the sending module is further configured to send the contactless card leaving information to the upper computer to trigger the first determining module 401 in the case that the third determining module determines that the first in-place identification as invalid.

In Embodiment 4, the card reader further includes:

a second initializing module which is configured to initialize the first receiving identification as invalid;

a fourth determining module which is configured to determine whether the first receiving identification is valid;

in Embodiment 4, the receiving module 404 is specifically configured to wait for receiving the command sent from the upper computer in the case that the fourth determining module determines that the first receiving identification as invalid;

in Embodiment 4, the first processing module 408 is further configured to do corresponding operation on the contactless card according to the first command in the case that the fourth determining module determines that first receiving identification as valid so as to obtain the operation result; and the setting module is further configured to set the first receiving identification as valid in the case that the receiving module receives the first command.

In Embodiment 4, the card reader further include:

a fifth determining module which is configured to determine the first receiving identification as valid;

a sixth determining module which is configured to determine whether the first command is an obtaining contactless card status instruction in the case that the fifth determining module determines that the first receiving identification is valid;

in Embodiment 4, the setting module 407 is further configured to set the first receiving identification as invalid in the case that the sixth determining module determines that the first command is the obtaining contactless card status instruction;

furthermore, the sending module 402 is further configured to organize the contactless card status information and send the information to the upper computer to trigger the first determining module 401; and in Embodiment 4, the first determining module 401 is specifically configured to determine whether the first in-place identification is valid in the case that the fifth determining module determines that the first receiving identification is invalid; the first determining module 401 is further configured to determine whether the first in-place identification is valid in the case that the sixth determining module determines that the first command is not the obtaining contactless card status instruction.

In Embodiment 4, the card reader further includes:

a seventh determining module which is configured to determine whether the contactless card which is operating currently is a first class of card when the second determining module 406 determines that the contactless card supports high-speed data communication and before the first processing module 408 does corresponding operation on the contactless card according to the first command to obtain the operation result;

in Embodiment 4, the setting module 407 is further configured to amend the parameters of the contactless card reader chip according to a second class of card in the case that the seventh determining module determines that the contactless card which is operating currently is the first class of card so as to trigger the first processing module 601;

in Embodiment 4, the first processing module 408 is further configured to do corresponding operation on the contactless card according to the first command to obtain the operation result in the case that the seventh determining module determines that the contactless card which is operating currently is not the first class of card.

In Embodiment 4, the speed regulation module 405 includes:

a sending unit which is configured to send a speed regulation inquiring instruction before the speed regulation inquiring instruction is sent to the contactless card;

a receiving unit which is configured to receive speed regulation inquiring response data returned from the contactless card;

a first determining unit which is configured to determine whether the receiving unit receives the speed regulation inquiring response data returned from the contactless card;

a second determining unit which is configured to determine whether the contactless card which is speed regulated supports a preset speed and a speed faster than the preset speed in the case that the first determining unit determines that the receiving unit receives the speed regulation inquiring response data returned from the contactless card;

in Embodiment 4, the sending unit is further configured to send a speed regulation setting instruction to the contactless card in the case that the second determining unit determines that the contactless card which is speed regulated supports the preset speed and the speed faster than the preset speed; and in Embodiment 4, the setting module 407 is specifically configured to set the communication speed for sending the first command received to the contactless card as a third communication speed and set the communication speed for receiving the operation result returned from the contactless card as a fourth communication speed in the case that the first determining unit determines that the receiving unit does not receive the speed regulation inquiring response data returned from the contactless card; the setting module 407 is further configured to set the communication speed for sending the first command received to the contactless card as the third communication speed and set the communication speed for receiving the operation result returned from the contactless card as the fourth communication speed and set the first in-place identification as valid in the case that the second determining unit determines that the contactless card which is speed regulated does not support the preset speed or the speed faster than the preset speed.

Furthermore, in Embodiment 4, the second determining unit is specifically configured to parse the received speed regulation inquiring response data, and determine whether the preset speed is faster than a sending speed and a receiving speed supported by the contactless card which is speed regulated.

In Embodiment 4, the speed regulation module 405 further includes:

a third determining unit which is configured to determine the fastest speed supported by the contactless card which is speed regulated is faster than the fastest speed supported by the card reader, if yes, the fastest speed supported by the card reader is made as the consulted communication speed and the sending unit is triggered; otherwise, the fastest speed supported by the contactless card is made as the consulted communication speed, and the sending unit is triggered.

In Embodiment 4, the third determining unit includes:

a first determining sub-unit which is configured to determine whether the fastest sending speed supported by the contactless card which is speed regulated is faster than the fastest receiving speed supported by the card reader;

an acting sub-unit which is configured to make the fastest receiving speed supported by the card reader as the consulted receiving speed and trigger the second determining sub-unit in the case that the first determining sub-unit determines that the fastest sending speed supported by the contactless card which is speed regulated is faster than the fastest receiving speed supported by the card reader; and the acting sub-unit is configured to make the fastest sending speed supported by the contactless card as the consulted receiving speed and trigger the second determining sub-unit in the case that the first determining sub-unit determines that the fastest sending speed supported by the contactless card which is speed regulated is not faster than the fastest receiving speed supported by the card reader;

in Embodiment 4, the second determining sub-unit is configured to determine whether the fastest receiving speed supported by the contactless card which is speed regulated is faster than the fastest sending speed supported by the card reader;

in Embodiment 4, the acting sub-unit is further configured to make the fastest receiving speed supported by the contactless card as the consulted sending speed and trigger the sending unit in the case that the second determining sub-unit determines that the fastest receiving speed supported by the contactless card which is speed regulated is faster than the fastest sending speed supported by the card reader; the acting sub-unit is further configured to make the fastest receiving speed supported by the contactless card as the consulted sending speed and trigger the sending unit in the case that the second determining sub-unit determines that the fastest receiving speed supported by the contactless card which is speed regulated is not faster than the fastest sending speed supported by the card reader.

Furthermore, in the setting module 407, that setting the communication speed for sending the first command received to the contactless card as the first communication speed, and setting the communication speed for receiving the operation result returned from the contactless card as the second communication speed specifically includes setting the communication speed for sending the first command received to the contactless card as the consulted sending speed, and setting the communication speed for receiving the operation result returned from the contactless card as the consulted receiving speed.

In Embodiment 4, the card reader further includes:

an eighth determining module which is configured to determine whether a second in-place identification is valid;

in Embodiment 4, the sending module 402 is further configured to send contact card in-place information to the upper computer in the case that the eighth determining module determines that the second in-place identification is valid;

in Embodiment 4, the eighth determining module is further configured to continuously determine whether the second in-place identification is valid in the case that the eighth determining module determines that the second in-place identification is invalid;

a second processing module is configured to do corresponding operation on the contact card according to a second command in the case that the receiving module receives the second command so as to obtain an operation result;

in Embodiment 4, the sending module 402 is further configured to the operation result obtained by the second processing module to the upper computer to trigger the eighth determining module.

In Embodiment 4, the card reader further includes:

a third initializing module configured to initialize the second in-place identification as invalid, and initialize the second receiving identification as invalid;

a ninth determining module configured to determine whether the second in-place identification is valid before the second process module does corresponding operation on the contact card according to the second command to obtain the operation result;

in Embodiment 4, the sending module 402 is further configured to send contact card leaving information to the upper computer to trigger the eighth determining module in the case that the ninth determining module determines that the second in-place identification is invalid;

furthermore, the second process module is specifically configured to do corresponding operation on the contact card according to the second command to obtain the operation result in the case that the ninth determining module determines that the second in-place identification is valid;

in Embodiment 4, the setting module 407 is further configured to set the second receiving identification as valid in the case that the receiving module receives the second command.

In Embodiment 4, the card reader further includes:

a tenth determining module which is configured to determine whether the second receiving identification is valid;

in Embodiment 4, the eighth determining module is specifically configured to determine whether the second in-place identification is valid in the case that the tenth determining module determines that the second receiving identification is invalid;

an eleventh determining module which is configured to determine whether the second command is an obtaining contact card status instruction in the case that the tenth determining module determines that the second receiving identification is valid;

in Embodiment 4, the setting module 407 is further configured to set the second receiving identification as invalid in the case that the eleventh determining module determines that the second command is the obtaining contact card status instruction;

in Embodiment 4, the sending module 402 is further configured to organize contact card status information and send the information to the upper computer to trigger the eighth determining module;

in Embodiment 4, the ninth determining module is specifically configured to determine whether the second in-place identification is valid in the case that the eleventh determining module determines that the second command is not the obtaining contact card status instruction.

According to the present invention, by increasing the communication speed between the contactless card reader and the contactless card, the time period for interaction between the contactless card reader and the contactless card can be shortened, so that it becomes more convenient for users.

Embodiments described herein are just a few Embodiments of the present invention. On the basis of Embodiments of the invention, all other related Embodiments made by those skilled in the art without any inventive work belong to the scope of protection of the resent invention as defined by the appended Claims.

The invention claimed is:

1. A working method of a card reader supporting high speed data communication, wherein said method comprises the following steps:

S1) determining, by the card reader, whether a first in-place identification is valid, if yes, sending contactless card in-place information to an upper computer, and executing Step S5; otherwise, executing Step S2;

S2) sending, by the card reader, an inquiring-card instruction in a contactless field, and sending a speed regulation setting instruction to the contactless card in the case that an inquiring-card response data returned from the contactless card is received, and determining whether speed regulation setting successful response data, which is returned from the contactless card, is received, if yes, executing Step S3; otherwise, executing Step S4;

S3) setting, by the card reader, the communication speed for sending a first command received to the contactless card as a first communication speed, and receiving an operation result returned from the contactless card as a second communication speed, and setting the first in-place identification as valid, sending the card in-place information to the upper computer, and executing Step S5;

S4) setting, by the card reader, the communication speed for sending the first command received to the contactless card as a third communication speed, and receiving the operation result returned from the contactless card as a fourth communication speed, and setting the first in-place identification as valid, sending the card in-place information to the upper computer, and executing Step S5, the first communication speed is faster than the third communication speed, and the second communication speed is faster than the fourth communication speed; and S5) waiting for, by the card reader, receiving a command sent from the upper computer, doing an operation on the contactless card according to the first command so as to obtain an operation result in the case that the first command is received, sending the operation result to the upper computer, and returning to Step S1.

2. The working method as claimed in claim 1, wherein before Step S1, said method further comprises: initializing, by the card reader, the first in-place identification as invalid;

in Step S5, the card reader waits for receiving the command sent from the upper computer, and when the first command is received, the method further comprises: determining, by the card reader, whether the first in-place identification is valid, if yes, doing the operation on the contactless card according to the first command to obtain the operation result, and sending the operation result to the upper computer, and returning to Step S1; otherwise, sending contactless card leaving information to the upper computer, and returning to Step S1.

3. The working method as claimed in claim 1, wherein before Step S1, the method further comprises: initializing, by the card reader, a first receiving identification as invalid;

before Step S5, the method further comprises: determining, by the card reader, whether the first receiving identification is valid, if yes, doing the operation on the contactless card according to the first command to obtain the operation result, and sending the operation result to the upper computer, and returning to Step S1; otherwise, executing Step S5;

in Step S5, in the case that the first command is received from the card reader, the method further comprises: setting, by the card reader, the first receiving identification as valid.

4. The working method as claimed in claim 3, wherein, before Step S1, the method further comprises the following steps:

A1) determining, by the card reader, whether the first receiving identification is valid, if yes, executing Step A2; otherwise, executing Step S1;

A2) determining, by the card reader, whether the first command is an obtaining contactless card status instruction, if yes, executing Step A3; otherwise, executing Step S1; and A3) setting, by the card reader, the first receiving identification as invalid, organizing the contactless card status information and sending the information to the upper computer, and executing Step S1.

5. The working method as claimed in claim 1, wherein, in the case that the speed regulation setting successful response data returned from the contactless card is received in Step S2, before the card reader doing the operation on the contactless card according to the first command to obtain the operation result in Step S5, the method further comprises:

determining, by the card reader, whether the contactless card being currently operated is a first class of card, if yes, amending parameters of a contactless card reading chip in accordance with a second class of card, and doing the operation on the contactless card according to the first command to obtain the operation result; otherwise, doing the operation on the contactless card according to the first command to obtain the operation result.

6. The working method as claimed in claim 1, wherein before the card reader sending the speed regulation setting instruction to the contactless card in Step S2, the method further comprises the following steps:

A1') sending, by the card reader, a speed regulation inquiring instruction to the contactless card, and determining whether speed regulation inquiring response data returned from the contactless card is received, if yes, executing Step A2'; otherwise, determining that the contactless card does not support high-speed data communication, and executing Step S4; and A2') determining, by the card reader, whether the contactless card supports a preset speed or a communication speed faster than the preset speed after a speed regulation of the contactless card according to the speed regulation inquiring response data, if yes, sending the speed regulation setting instruction to the contactless card; otherwise, determining that the contactless card does not support the high-speed data communication, and executing Step S4.

7. The working method as claimed in claim 6, wherein, Step A2' specifically comprises: analyzing, by the card reader, the speed regulation inquiring response data which is received, and determining whether the preset speed is faster than a sending speed and a receiving speed supported by the contactless card which is speed-regulated, if yes, determining that the contactless card does not support high-speed data communication, and executing Step S4; otherwise, sending the speed regulation setting instruction to the contactless card.

8. The working method as claimed in claim 7, wherein after Step A2', the method further comprises the following step:

B) determining, by the card reader, the fastest speed supported by the contactless card which is speed-regulated is faster than the fastest speed supported by the card reader, if yes, making the fastest speed supported by the card reader as a consulted communication speed, and sending the speed regulation setting instruction to the contactless card; otherwise, making the fastest speed supported by the contactless card as the consulted communication speed, and sending the speed regulation setting instruction to the contactless card.

9. The working method as claimed in claim 8, wherein, Step B specifically comprises:

B-1) determining, by the card reader, whether a fastest sending speed supported by the contactless card which is speed-regulated is faster than a fastest receiving speed supported by the card reader, if yes, making the fastest receiving speed supported by the card reader as a consulted receiving speed, and executing Step B-2; otherwise, making the fastest sending speed supported by the contactless card as the consulted receiving speed, and executing Step B-2; and B-2) determining, by the card reader, whether the fastest receiving speed supported by the contactless card which is speed-regulated is faster than the fastest sending speed supported by the card reader, if yes, making the fastest sending speed supported by the card reader as the consulted sending speed, and sending the speed regulation setting instruction to the contactless card; otherwise, making the fastest receiving speed supported by the contactless card as the consulted sending speed, and sending the speed regulation setting instruction to the contactless card.

10. The working method as claimed in claim 9, wherein, setting, by the card reader, the communication speed for sending the first command received to the contactless card as the first communication speed, and receiving an operation result returned from the contactless card as the second communication speed in Step S4 specifically comprises: setting, by the card reader, the communication speed for sending the first command received to the contactless card as the consulted sending speed, and receiving the operation result returned from the contactless card as the consulted receiving speed.

11. A card reader which supports a high speed data communication, wherein said card reader comprises:
   a first determining module configured to determine whether a first in-place identification is valid;
   a sending module configured to send a contactless card in-place information to an upper computer in the case that the first determining module determines that the first in-place identification is valid;
   an inquiring card module configured to send an inquiring card instruction in a contactless field in the case that the first determining module determines the first in-place identification is invalid;
   a receiving module configured to receive an inquiring card response data returned from the contactless card after the inquiring module sends the inquiring card instruction in the contactless field;
   a speed regulation module configured to send a speed regulation setting instruction to the contactless card in the case that the receiving module receives the inquiring card response data returned from the contactless card;
   in which the receiving module is further configured to receive a speed regulation setting successful response data returned from the contactless card after the speed regulation module sends the speed regulation setting instruction to the contactless card;
   a second determining module configured to determine whether the receiving module receives the speed regulation setting successful response data which is returned from the contactless card;
   a setting module configured to set a communication speed for sending a first command received to the contactless card as a first communication speed, and receiving an operation result returned from the contactless card as a second communication speed, and to set a first in-place identification as valid in the case that the second determining module determines that the receiving module receives the speed regulation setting successful response data returned from the contactless card; and to set the communication speed for sending the first command received to the contactless card as the third communication speed, and receiving the operation result returned from the contactless card as the fourth communication speed, and to set the first in-place identification as valid in the case that the second determining module determines that the receiving module does not receive the speed regulation setting successful response data returned from the contactless card; the first communication speed is faster than the third communication speed, and the second communication speed is faster than the fourth communication speed;
   in which the sending module is further configured to send the card in-place information to the upper computer in the case that the setting module sets the first in-place identification as valid; and
   the receiving module is further configured to wait for receiving the command sent from the upper computer after the sending module sends the contactless card in-place information to the upper computer; and
   a first processing module configured to do an operation on the contactless card according to a first command so as to obtain an operation result in the case that the receiving module receives the first command;
   in which the sending module is further configured to send the operation result obtained from the first processing module to the upper computer.

12. The card reader as claimed in claim 11, wherein the card reader further comprises:
   a first initializing module configured to initialize the first in-place identification as invalid; and
   a third determining module configured to determine whether the first in-place identification is valid in the case that the receiving module receives the first command;
   in which the first processing module is specifically configured to do the operation on the contactless card according to the first command to obtain the operation result in the case that the third determining module determines that the first in-place identification is valid; and
   the sending module is further configured to send the contactless card leaving information to the upper computer in the case that the third determining module determines that the first in-place identification is invalid so as to trigger the first determining module.

13. The card reader as claimed in claim 11, wherein said card reader further comprises:
   a second initializing module configured to initialize the first receiving identification as invalid; and
   a fourth determining module configured to determine whether the first receiving identification is valid;
   in which the receiving module is specifically configured to wait for receiving the command which is sent from the upper computer in the case that the fourth determining module determines that the first receiving module is invalid;
   the first processing module is further configured to do the operation on the contactless card according to the first command to obtain the operation result in the case that the fourth determining module determines that the first receiving identification is valid; and
   the setting module is further configured to set the first receiving identification as valid in the case that the receiving module receives the first command.

14. The card reader as claimed in claim 13, wherein said card reader further comprises:
   a fifth determining module configured to determine whether the first receiving identification is valid; and
   a sixth determining module configured to determine whether the first command is an obtaining contactless card status instruction in the case that the fifth determining module determines the first receiving identification is valid;

in which the setting module is further configured to set the first receiving identification as invalid in the case that the sixth determining module determines that the first command is the obtaining contactless card status instruction;

the sending module is further configured to organize the contactless card status information and send the information to the upper computer to trigger the first determining module; and the first determining module is specifically configured to determine whether the first in-place identification is valid in the case that the fifth determining module determines the first receiving identification is invalid; and determine whether the first in-place identification is valid in the case that the sixth determining module determines the first command is not the obtaining contactless card status instruction.

15. The card reader as claimed in claim 11, wherein said card reader further comprises:
    a seventh determining module configured to determine whether the contactless card which is operating currently is a first class of card in the case that the second determining module determines that the contactless card supports high-speed data communication and before the first processing module does the operation on the contactless card according to the first command so as to obtain the operation result;
    in which the setting module is further configured to amend parameters of the contactless card reading chip in accordance with a mode of a second class of card to trigger the first processing module in the case that the seventh determining module determines that the contactless card which is operating currently is the first class of card; and
    the first processing module is further configured to do the operation to the contactless card according to the first command to obtain the operation result in the case that the seventh determining module determines that the contactless card which is operating currently is not the first class of card.

16. The card reader as claimed in claim 11, wherein the speed regulation module comprises:
    a sending unit configured to send a speed regulation inquiring instruction before the speed regulation setting instruction is sent to the contactless card;
    a receiving unit configured to receive the speed regulation inquiring response data which is returned from the contactless card;
    a first determining unit configured to determine whether the receiving unit receives the speed regulation inquiring response data which is returned from the contactless card;
    a second determining unit configured to determine whether the contactless card which is speed-regulated supports the preset speed or the speed faster than the preset speed after the contactless card is speed regulated in the case that the first determining unit determines that the receiving unit receives the speed regulation inquiring response data returned from the contactless card;
    in which the sending unit is further configured to send the speed regulation setting instruction to the contactless card in the case that the second determining unit determines that the contactless card supports the preset speed and the speed faster than the preset speed after the contactless card is speed-regulated; and the setting module is specifically configured to set the communication speed for sending the first command received to the contactless card as the third communication speed and receiving the operation result returned from the contactless card as the fourth communication speed, and to set the first in-place identification as valid in the case that the first determining unit determines the receiving unit does not receive the speed regulation response data returned from the contactless card; and to set the communication speed for sending the first command received to the contactless card as the third communication speed and receiving the operation result returned from the contactless card as the fourth communication speed, and to set the first in-place identification as valid in the case that the second determining unit determines that the contactless card does not support the preset speed and the speed which is faster than the preset speed after the contactless card is speed-regulated.

17. The card reader as claimed in claim 16, wherein the second determining unit is specifically configured to parse the speed regulation inquiring response data received, determine whether the preset speed is faster than the sending speed and the receiving speed which are supported by the contactless card which is speed-regulated.

18. The card reader as claimed in claim 17, wherein the speed regulation module further comprises:
    a third determining unit configured to determine whether the fastest speed supported by the contactless card which is speed-regulated is faster than the fastest speed supported by the card reader, if yes, making the fastest speed supported by the card reader as the consulted communication speed and triggering the sending unit; otherwise, making the fastest speed supported by the contactless as the consulted communication speed, and triggering the sending unit.

19. The card reader as claimed in claim 18, wherein the third determining unit comprises:
    a first determining sub-unit configured to determine whether the fastest sending speed supported by the contactless card which is speed-regulated is faster than the fastest receiving speed supported by the card reader; and
    an acting sub-unit configured to make the fastest receiving speed supported by the card reader as the consulted receiving speed to trigger a second determining sub-unit in the case that the first determining sub-unit determines that the fastest sending speed supported by the contactless card which is speed-regulated is faster than the fastest receiving speed supported by the card reader; and to make the fastest sending speed supported by the contactless card as the consulted communication speed to trigger the second determining sub-unit in the case that the first determining sub-unit determines that the fastest sending speed supported by contactless card which is speed-regulated is not faster than the fastest receiving speed supported by the card reader;
    in which the second determining sub-unit is configured to determine whether the fastest receiving speed supported by the contactless card which is speed-regulated is faster than the fastest sending speed supported by the card reader; and
    the acting sub-unit is further configured to make the fastest receiving speed supported by the contactless card as the consulted sending speed to trigger the sending unit in the case that the second determining sub-unit determines that the fastest receiving speed supported by the contactless card which is speed-regulated is faster than the fastest sending speed supported by the card reader; and to make the fastest receiving speed as the consulted sending speed and trigger the sending unit in the case that the second determining sub-unit determines the fastest receiving speed supported by the contactless card which is speed-regulated is not faster than the fastest sending speed supported by the card reader.

20. The card reader as claimed in claim 19, wherein, in the setting module, setting the communication speed for sending the first command received to the contactless card as the first communication speed, and receiving the operation result returned from the contactless card as the second communication speed, is specifically configured to set the communication speed for sending the received first command to the contactless card as the consulted sending speed, and receiving the operation result returned from the contactless card as the consulted receiving speed.

* * * * *